March 5, 1968 E. E. GARRETT 3,372,242

MAGNETIC TAPE DEVICE WITH FLEXIBLE HEAD MOUNTING AND MOVING MEANS

Filed Dec. 10, 1963 2 Sheets-Sheet 1

INVENTOR
ELMER E. GARRETT
BY Bosworth Bosworth
ATTORNEYS

INVENTOR
ELMER E. GARRETT
BY Borst & Borst
ATTORNEYS

United States Patent Office 3,372,242
Patented Mar. 5, 1968

3,372,242
MAGNETIC TAPE DEVICE WITH FLEXIBLE HEAD MOUNTING AND MOVING MEANS

Elmer E. Garrett, Rte. 133, Bridgewater, Conn. 06752

Filed Dec. 10, 1963, Ser. No. 329,538
6 Claims. (Cl. 179—100.2)

ABSTRACT OF THE DISCLOSURE

A magnetic tape device having a magnetic recording and reproducing head carried by a flexible tongue. The tongue is slidable in a guide which has straight and arcuate sections, the latter being housed. A motor driven feed means causes the tongue to move in and out of the arcuate guide while a spring pressed take up device winds and unwinds the electrical connectors for the head. Circuitry is provided for selectively stopping the tongue after a single cycle or alternatively to cause it to cycle continuously.

This invention relates to tape recording and pick up devices and in particular devices of this general character which are employed to read from or record on permanently arranged magnetic strips.

Hitherto it has been the practice to record and pick up magnetically by employing a head which is either manually pushed over the strip or which is supported on a carriage mounted in its entirety over the card containing the strips with elaborate mechanism for causing the head to scan each line and to move in the opposite direction to other lines of magnetic strip as desired. It is the object of this invention to provide mechanism which reduces considerably the complexity of such devices. Where there is a plurality of lines to scan, it is only required that the card be manually arranged under the path of an extensible arm supported and actuated by mechanism located off the card so that the desired magnetic strip on the card can be scanned by the magnetoelectric head carried on the free end of the arm. Because such devices are used frequently by students, the saving in cost of manufacture is of significant benefit and advantage.

Another object of the invention is to provide a magnetic tape device of simple construction having selective means for establishing a single, one cycle or a continuous stroking of the pick up head as desired.

Other objects and advantages of the invention will be appreciated on reading the following detailed description of one embodiment thereof which is taken in conjunction with the accompanying drawings, in which.

Figure 1:
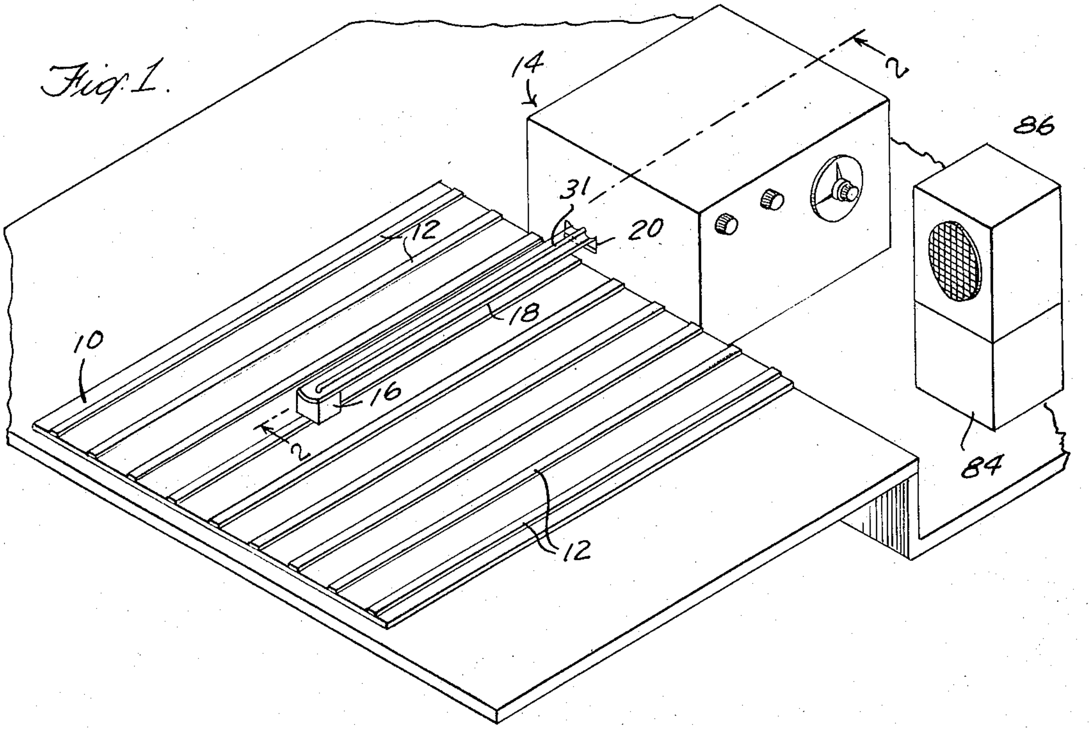
FIGURE 1 is a perspective view showing the magnetic tape device.
Figure 2:
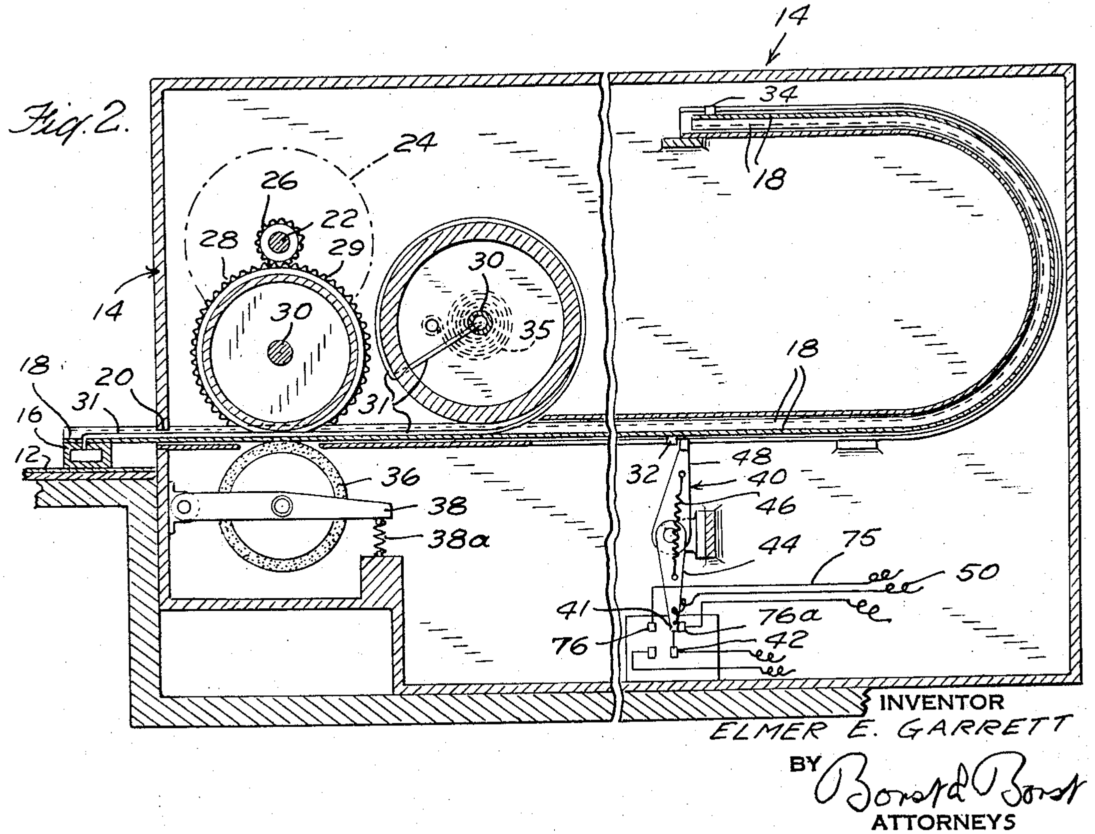
FIGURE 2 is an enlarged section taken on the line 2—2 showing the mechanical components provided for actuating the flexible tongue for the pick up head.

Referring to the drawings, a lesson card 10 containing a plurality of magnetic strips 12 some of which at least will have prerecorded lesson, such as language study, material thereon leaving, if desired, other strips for recording by the user to afford opportunity for him to repeat back portions of the prerecorded material.

Housing 14 contains the mechanism for causing the head 16, which may be recording or read back head, to traverse over the magnetic strip which is selected for recording or reading by the user by appropriate placement of the card 10 under the path of travel of the head 16.

The head is supported at one end of a flexible tongue 18 which rides in and out of an arcuately arranged guide

20 disposed in the rear of the housing. Shaft 22 driven by motor 24 is connected through gears 26 and 28 to drive feed roller 29 on shaft 30, the roller 29 being slotted to provide clearance for lead wires 31 for the head 16 and stop pins 32 and 34 on the tongue 18 whose function is described below. The lead wires 31 for the head are wound about a rotatable drum 33 and are affixed to tensioning spring 35 which serve to take up lead wire slack as the tongue is caused to retract, the lead wires passing out through the center of the drum shaft. Underneath the tongue there is provided a tongue support roller 36 which is mounted for rotation on a pivotal lever 38 adapted to yield due to its compression spring **38*a* which biases the lever 38 and the roller 36 against the tongue 18** carrying the head.

A toggle switch 40 is employed to control the direction of tongue travel as well as the energization of the playback or recording circuit. In the interest of simplicity, there is shown a speaker only in this circuit although obviously a microphone may be connected thereon without altering circuit performance and its control in principle. It is desired that there be control of the head and of the speaker circuit by a common switch control unit. To this end the toggle switch 40 is positioned by stop pin 32, which serves to limit tongue retraction and by stop pin 34, which serves to limit tongue extension, to position thereby contact 41 which determines the direction of tongue travel and also movable contact 42 which is used to open and close the playback circuit. The contact 41 is on the lower pivot arm 44 of the toggle switch 40 which is connected by a spring 46 to an upper arm 48. The position of the arm depends on which side of the pivot point of the two arms the spring connection on the upper arm is moved by the stop pins 32 and 34 on the tongue.

The contact 41 is connected by conductor 50 to one side of the motor 24 the other side of which is connected to batteries 52 and 54 through main switch 56 by means of conductors 58 and 60. The positive terminal of battery 52 is connected by lead 62 in read out circuit 63 to terminal 64 through holding coil 66 arranged on the spring biased shank of push button 68 for switch 69. The terminal 64 is also connected to the manual control terminal of read control switch 70 which also has an automatic control terminal connected by a shunt lead 72 to terminal 74 of the switch 69. The terminal 74 is connected by lead 75 to contact 76 adapted to be engaged by the contact 41 of the free end of the toggle switch arm 44 when stop pin 34 strikes the upper arm 48 of the toggle switch 40. The above described circuit is energized by the battery 52 to cause the tongue 18 to retract so that the head 16 is enabled to read out or record as the case may be. The contact 41 is also adapted to engage the contact **76*a* in reset circuit 63*a* which is an exact duplicate of the read out circuit 63 having corresponding components assigned with some numerals with subscript as appended thereto. The reset circuit is poled by the battery 54 to drive the motor in the opposite direction to that in which it is driven by the read out circuit 63 thereby causing the tongue to extend until stop pin 34 strikes the toggle switch arm 48 in the opposite direction. To prevent the contact 40 from stopping dead center when the motor circuit is opened by one of the stop pins on the tongue, fly wheel 78** is mounted on the motor shaft.

The contact 41 is mechanically connected to the movable contact 42 of the play back circuit 80, the contact 42 being adapted thereby to engage fixed contact 82 in that circuit. The contacts 82 and 42 are connected to series connected amplifier 84 and speaker 86 respectively in the play back circuit. As mentioned above recording units may optionally be disposed in the circuit 80 which is connected to the read out head 16 through the main switch 56.

Figure 3:
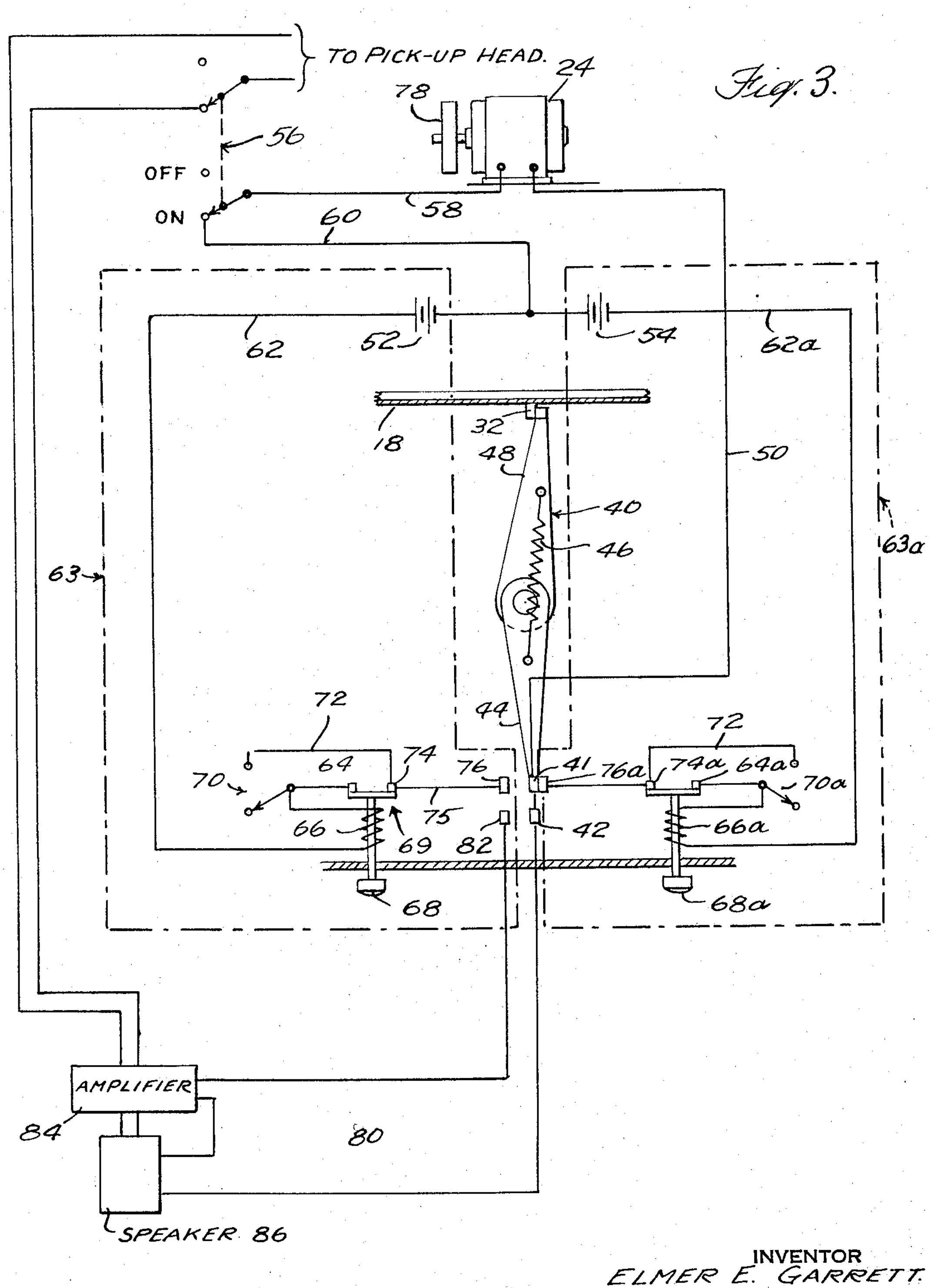
FIGURE 3 is a wiring diagram for the amplifier circuit and the control thereof by the tongue operated automatic and manual switching circuit.

With the main switch closed it may be seen that in operation the tongue will be caused to cycle continuously if both control switches 70 and 70*a* are set to automatic so as to shunt out the manually operated switches 69 and 69*a*. On the other hand if the switch 40 is in the position shown in FIGURE 3 with the tongue fully retracted, for example, and the switch 70 is set to automatic and the switch 70*a* is set to manual, pushing the button 68*a* to close contacts 74*a* and 64*a* will cause the tongue to extend and retract for play back and then stop after the full cycle is completed. The speaker circuit 80 is energized solely during the read out step in the cycle.

Various modifications of the described embodiment of invention may be effected by persons skilled in the art without departing from the scope and principle of invention as defined in the appended claims.

What is claimed is:

1. A magnetic tape device comprising a housing, a tongue guide having a straight and an arcuate section disposed in said housing, a flexible tongue one end of which extends outside said housing, the other end of said tongue being disposed on said guide, a pick-up head supported on said one end of the tongue, an amplifier and speaker circuit connected to said head, and reversible drive means for causing said tongue to extend and retract over said guide as desired, means for causing said circuit to cut off as the tongue is retracted, said reversible drive means including selective switching means for causing said tongue to stop after a single stroke has been completed, and selective switching means for causing said tongue to cycle continuously, said reversible drive means also including a feed roller impinging on said tongue and a motor in gear connection with said feed roller to cause said tongue to move into and out of the arcuate section of said guide and said circuit including a wire connection for said head carried by said tongue, there being provided a rotatable drum with tensioning spring, said wire connection being wound over the drum having its slack taken up by the spring on the retraction of said tongue.

2. A magnetic tape device comprising a housing, a tongue guide having a straight and arcuate section disposed in said housing, a flexible tongue one end of which extends outside said housing, the other end of said tongue being disposed on said guide, a pick-up head supported on said one end of the tongue, an amplifier and speaker circuit connected to said head, and reversible drive means for causing said tongue to extend and retract over said guide as desired, said reversible drive means including a feed roller impinging on said tongue and a motor in gear connection with said feed roller to cause said tongue to move into and out of the arcuate section of said guide and said circuit including a wire connection for said head carried by said tongue, there being provided a rotatable drum with tensioning spring, said wire connection being wound over the drum having its slack taken up by the spring on the retraction of said tongue.

3. A magnetic tape device comprising a housing, an arcuately shaped tongue guide disposed in said housing and having an end portion positioned adjacent to one wall of said housing in line with an opening in said wall, a flexible tongue disposed on said arcuate guide with an outer end extending through said wall opening to the outside of said housing, said end being free and unsupported when said tongue is completely extended from said housing, a pickup head supported on said free outer end of said tongue, an amplifier and speaker circuit connected to said head and reversible drive means for moving said tongue to extend and retract over said guide, thus to move said free end with its pickup head in a straight line between extended and retracted positions relative to the outside of said housing.

4. A magnetic tape device comprising a housing, a flexible tongue disposed in said housing with an outer end extending through one wall of said housing in line with an opening in said wall, said outer end being free and unsupported when said tongue is completely extended from said housing, said tongue being formed curvilinearly inside the housing when said tongue is in retracted position, a pickup head supported on said free outer end of said tongue, an amplifier and speaker circuit connected to said head and reversible drive means for moving said tongue to extend and retract through said housing wall, thus to move said free end with its pickup head in a straight line between extended and retracted positions relative to the outside of said housing.

5. A construction according to claim 4 and further comprising means for causing said circuit to cut off on the retraction of said tongue.

6. A tape device according to claim 5 wherein said reversible drive means includes selective switching means for causing said tongue to stop after a single stroke has been completed.

References Cited

UNITED STATES PATENTS

| | | | |
|---|---|---|---|
| 2,986,725 | 5/1961 | Dirks | 179—100.2 |
| 3,176,083 | 3/1965 | Houser | 179—100.2 |

BERNARD KONICK, *Primary Examiner.*

J. R. GOUDEAU, *Assistant Examiner.*